(12) United States Patent
Al-Otoom et al.

(10) Patent No.: US 8,078,852 B2
(45) Date of Patent: Dec. 13, 2011

(54) PREDICTORS WITH ADAPTIVE PREDICTION THRESHOLD

(75) Inventors: Muawya Mohamed Al-Otoom, Raleigh, NC (US); Timothy Hume Heil, Rochester, MN (US); Anil Krishna, Cary, NC (US); Ken Van Vu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/473,764

(22) Filed: May 28, 2009

(65) Prior Publication Data

US 2010/0306515 A1    Dec. 2, 2010

(51) Int. Cl.
*G06F 7/38* (2006.01)
*G06F 9/00* (2006.01)
*G06F 9/44* (2006.01)
*G06F 15/00* (2006.01)

(52) U.S. Cl. .................................. 712/240; 712/239
(58) Field of Classification Search .................. None
See application file for complete search history.

(56) References Cited

U.S. PATENT DOCUMENTS

| | | | |
|---|---|---|---|
| 5,687,360 A * | 11/1997 | Chang ............................ | 712/240 |
| 5,740,415 A | 4/1998 | Hara | |
| 7,058,795 B2 * | 6/2006 | Kacevas et al. ............... | 712/239 |
| 7,062,639 B2 | 6/2006 | Grochowski et al. | |
| 7,069,426 B1 | 6/2006 | Hummel | |
| 7,293,164 B2 | 11/2007 | DeWitt, Jr. et al. | |
| 2006/0161762 A1 | 7/2006 | Eisen et al. | |

OTHER PUBLICATIONS

Seznec; The O-GEHL branch predictor; CBP-1; 2004.*
Riley et al.; Probabilistic Counter Updates for Predictor Hysteresis and Bias; 2005.*
Loh et al.; Exploiting Bias in the Hysteresis Bit of 2-bit Saturating Counters in Branch Predictors; 2003.*
Seznec, "The O-GEHL branch predictor", pp. 1-4, retrieved Apr. 27, 2009 http://www.jilp.org/cbp/Andre.pdf.
Bhargava et al., "Value Prediction Design for High-Frequency Microprocessors", May 2002, pp. 1-29 http://lca.ece.utexas.edu/pubs/UT_LCA_TR-020508-01.pdf.
Egan, "Two-level Adaptive Branch Prediction", pp. 1-69, retrieved Apr. 27, 2009 http://www.capsl.ude.edu/seminars/2003/20030530.ppt.

* cited by examiner

*Primary Examiner* — Corey S Faherty
(74) *Attorney, Agent, or Firm* — Yee & Associates, P.C.; Joseph P. Abate

(57) ABSTRACT

An adaptive prediction threshold scheme for dynamically adjusting prediction thresholds of entries in a Pattern History Table (PHT) by observing global tendencies of the branch or branches that index into the PHT entries. A count value of a prediction state counter representing a prediction state of a prediction state machine for a PHT entry is obtained. Count values in a set of counters allocated to the entry in the PHT are changed based on the count value of the entry's prediction state counter. The prediction threshold of the prediction state machine for the entry may then be adjusted based on the changed count values in the set of counters, wherein the prediction threshold is adjusted by changing a count value in a prediction threshold counter in the entry, and wherein adjusting the prediction threshold redefines predictions provided by the prediction state machine.

20 Claims, 13 Drawing Sheets

PREDICTORS WITH ADAPTIVE PREDICTION THRESHOLD

BACKGROUND

1. Field

The disclosure relates generally to branch prediction in a data processing system, and more specifically to providing an adaptive prediction threshold scheme for dynamically adjusting prediction thresholds of entries in a Pattern History Table (PHT).

2. Description of the Related Art

A processor is the component in a data processing system that is used to execute instructions. Fundamentally, processors take signals in form of logic zeros and logic ones and manipulate these signals according to a set of instructions to produce an output in the form of logic zeros and ones. A processor contains various functional components, including execution units used to execute instructions. Additionally, a processor may include a branch predictor. A branch predictor is a part of a computer processor that determines whether a branch in the instruction flow will be taken by predicting the sequence in which instructions will be executed each time a program contains a conditional jump. This prediction is performed such that a pre-fetch or decode unit in the processor may obtain instructions without waiting for a branch to be resolved. Branch prediction data can be stored in a branch prediction table in a buffer on the processor. These branch prediction tables are used by the processor to determine if a branch is predicted to be taken or not taken. If a branch is predicted to be taken, the processor can pre-fetch data necessary for executing the branch instructions to improve processing performance.

SUMMARY

The embodiments of the disclosure provide an adaptive prediction threshold scheme for dynamically adjusting prediction thresholds of entries in a Pattern History Table by observing global tendencies of the branch or branches that index into the Pattern History Table entries. The illustrative embodiments obtain a count value of a prediction state counter in an entry in a pattern history table, wherein the count value represents a prediction state of a prediction state machine for the entry. The illustrative embodiments change one or more count values in a set of counters allocated to the entry in the pattern history table based on the count value of the prediction state counter in the entry. The prediction threshold of the prediction state machine for the entry may be adjusted based on an analysis of the changed one or more count values in the set of counters, wherein the prediction threshold is adjusted by changing a count value in a prediction threshold counter in the entry in the pattern history table, and wherein adjusting the prediction threshold redefines predictions provided by the prediction state machine.

DETAILED DESCRIPTION

Figure 1:
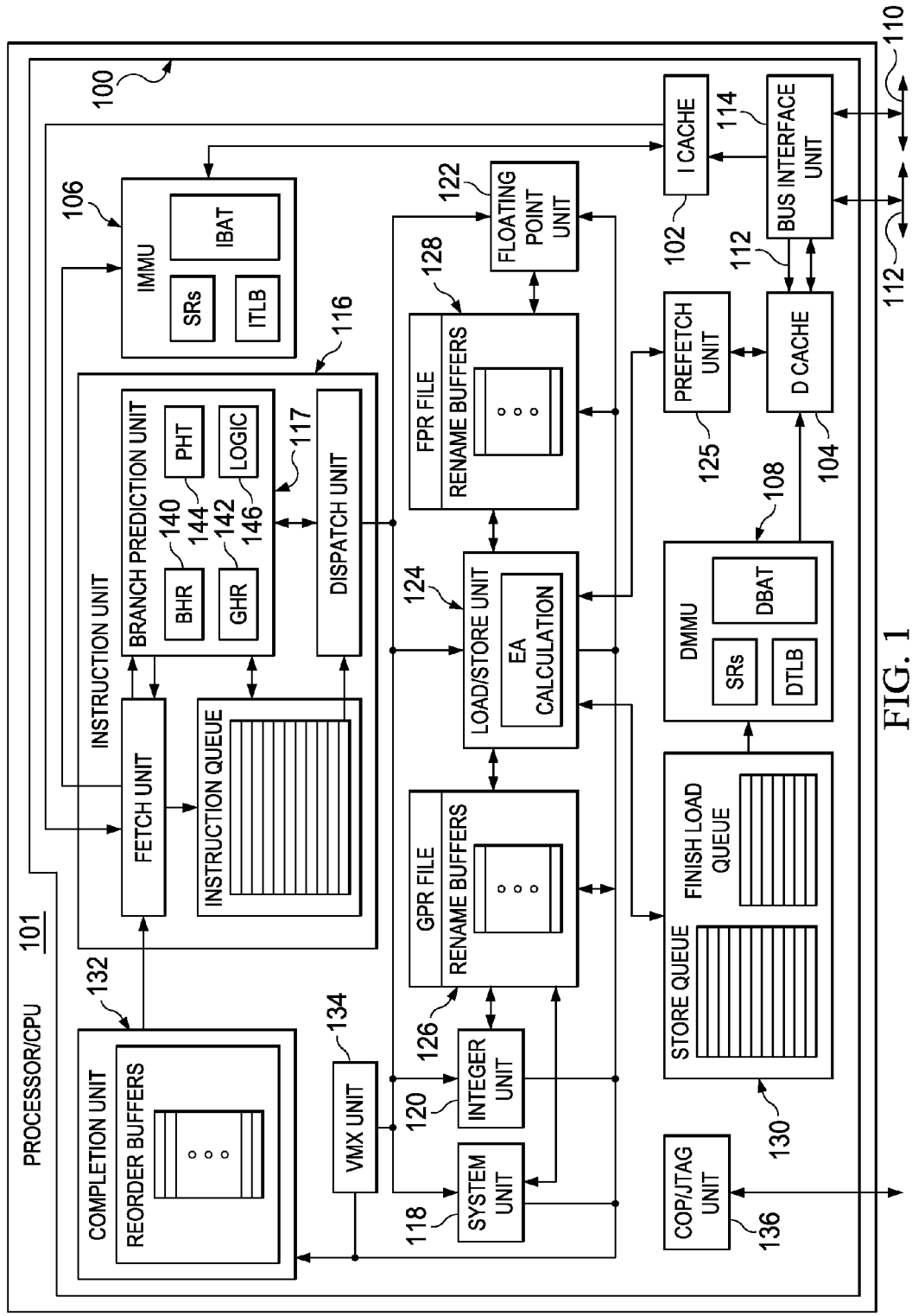
FIG. 1 is a block diagram illustrating an exemplary processor in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
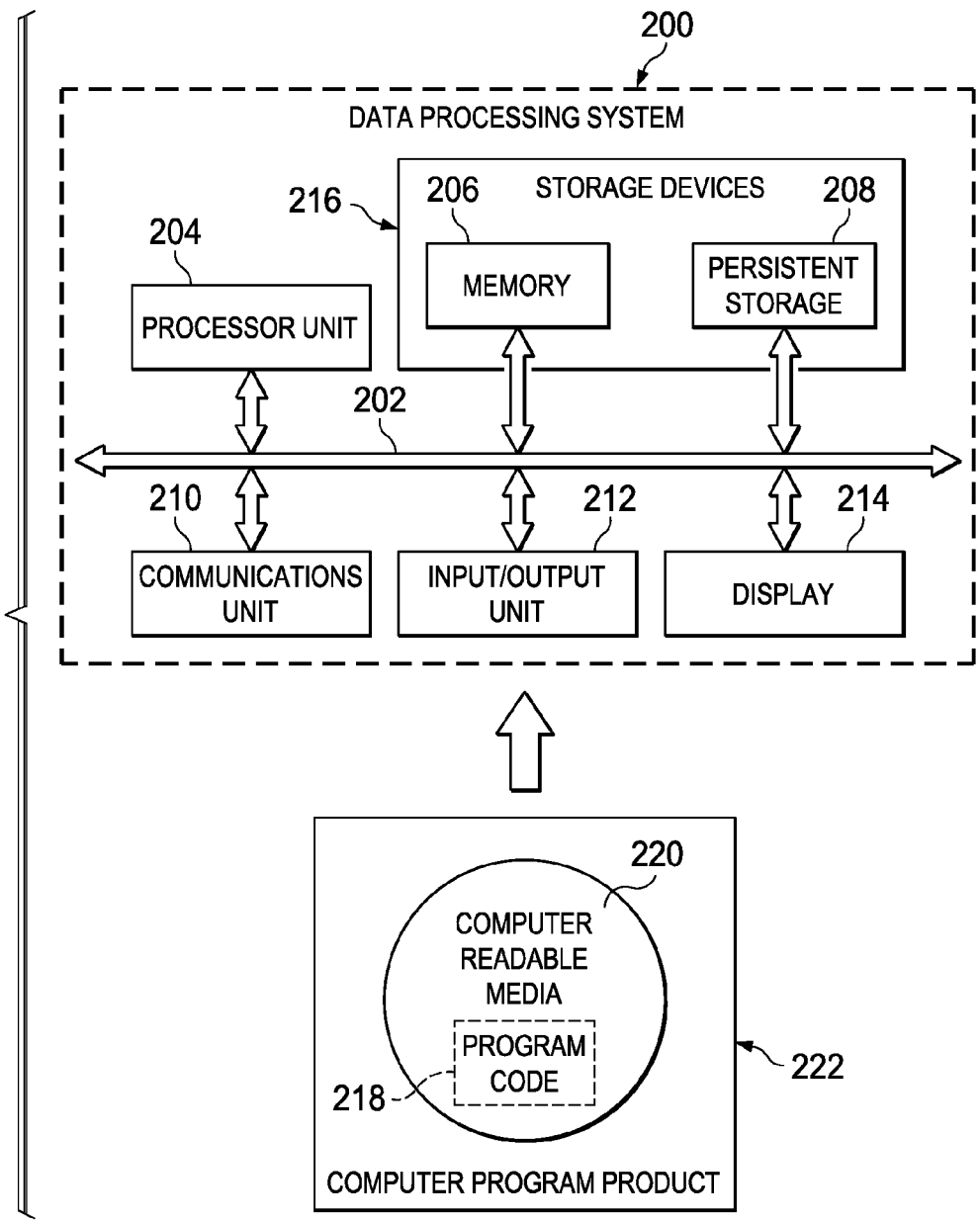
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is block diagram of an exemplary processor in which the illustrative embodiments may be implemented. Processor core 100 is included within a processor/CPU 101 that is a single integrated circuit superscalar microprocessor (CPU), such as the PowerPC™ processor available from IBM Corporation of Armonk, N.Y. Accordingly, processor core 100 includes various processing units both specialized and general, registers, buffers, memories, and other sections, all of which are formed by integrated circuitry.

Processor core 100 may include level one (L1) instruction and data caches ("I Cache" and "D Cache") 102 and 104, respectively, each having an associated memory management unit ("I MMU" and "D MMU") 106 and 108. As shown in FIG. 1, processor core 100 is connected to system address bus 110 and to system data bus 112 via bus interface unit 114. Instructions are retrieved from system memory (not shown) to processor core 100 through bus interface unit 114 and are stored in instruction cache 102, while data retrieved through bus interface unit 114 is stored in data cache 104. Instructions are fetched as needed from instruction cache 102 by instruction unit 116, which includes a fetch unit, a branch prediction unit, an instruction queue, and a dispatch unit. Branch prediction unit 117 may comprise a branch history register (BHR) 140, global history register (GHR) 142, prediction history table (PHT) 144, and associated control logic 146. Control logic 146 comprises prediction logic for determining whether to prefetch data into data cache 104 based on the contents of prediction bits stored in an entry in prediction history table 144. Branch history register 140 holds the program counter, target addresses, and taken/not taken history of previous n branches for an instruction. The taken/not taken history is stored as one bit and is shifted left on each branch with current branch information shifting in. Global history register 142 holds the program counter, target addresses, and taken/not taken history of previous n branches for all instructions. An entry in the prediction history table may hold target addresses and 2-bit saturating counters to enable or disable prefetching. When the current instruction is a branch, the program counter is used to select the prediction history table entry. The 2-bit saturating counter with a maximum value among the counters is identified, and the target address associated with the 2-bit saturating counter is returned as the prediction. The 2-bit saturating counter is incremented whenever the prefetched instruction is used in the cache and decremented if the instruction is replaced without having been used in cache. The prediction history table entry is updated when branches are filled in the branch history register.

The dispatch unit within instruction unit 116 dispatches instructions as appropriate to execution units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128. VMX unit 134 performs byte reordering, packing, unpacking, and shifting, vector add, multiply, average, and compare, and other operations commonly required for multimedia applications.

Load/store unit 124 loads instruction operands from prefetch unit 125 into general purpose integer registers 126, floating point registers 128, or VMX unit 134 as needed, and stores instructions results when available from general purpose integer registers 126, floating point registers 128, or VMX unit 134 into data cache 104. These instruction operands were loaded into prefetch unit 125 from data cache 104. Load and store queues 130 are utilized for these transfers from prefetch unit 125 to and from integer registers 126, floating point registers 128, or VMX unit 134.

Completion unit 132, which includes reorder buffers, operates in conjunction with instruction unit 116 to support out-of-order instruction processing, and also operates in connection with rename buffers within general purpose integer register 126 and floating point register 128 to avoid conflict for a specific register for instruction results. Common on-chip processor ("COP") and joint test action group ("JTAG") unit 136 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor core 100 may include, for example, multiple integer and floating point execution units to increase processing throughput. All such variations are within the spirit and scope of the present invention.

FIG. 2 is a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data.

Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A branch is a point in a computer program where the flow of control is altered. A branch instruction is an instruction that causes a conditional branch to either be taken or not taken. When a branch is not taken, the flow of control is unchanged and the next instruction to be executed is the instruction immediately following the current instruction. In contrast, when a branch is taken, the next instruction to be executed is an instruction at some non-sequential location in memory.

Pipelining is a processor feature that decreases processing time by allowing the processor to operate on different steps of an instruction at the same time. Pipelined processors are organized into stages that are linked into a 'chain', such that the output of each stage is fed to another stage until the processing job is completed. In such pipelined processors, the direction of a branch instruction (that is, whether the branch is taken or not) may not be resolved until later stages of the pipeline. Consequently, "bubbles" of empty stages (i.e., potential instruction processing slots) are introduced into the pipeline, which reduces processor performance. A branch predictor is the part of a processor that determines whether a conditional branch in the instruction flow of a program is likely to be taken or not. Branch predictors provide a solution to this performance issue by speculatively fetching instructions in the early stages of the pipeline to keep the pipeline full. One type of branch prediction, dynamic branch prediction, uses the results of past conditional branch instruction outcomes to predict the result of the current branch instructions.

A well known branch predictor comprises a table of 2-bit saturation counters, indexed with the least significant bits of the instruction addresses. This table is known as the pattern history table. A simple prediction algorithm for the branch predictor follows a four-state state machine model and previous branch events to predict whether the next branch will be taken or not taken by the instruction. The four states are referred to as "strongly taken", "weakly taken", "weakly not taken", and "strongly not taken". A "strongly" state corresponds to at least a previous number of branches having been taken or not taken, as the case may be. The "weakly" states correspond to the previous number of branches having differing results, with the next branch outcome either changing the prediction to the other result, or maintaining the prediction but in a "strongly" state. The saturation counters in the pattern history table receive event signals up to a predetermined number based on the outcome of a branch. For example, a saturation counter counts up if the branch is taken, and counts down if the branch is not taken. Saturation counters receive event signals up to a predetermined number based on the outcome of a branch. With 2-bits per branch state, each pattern history table entry may reflect one of the four states, such as 00 which indicates the strongly taken state, 01 which indicates the weakly taken state, 10 which indicates the weakly not taken state, and 11 which indicates the strongly not taken state.

Figure 3:
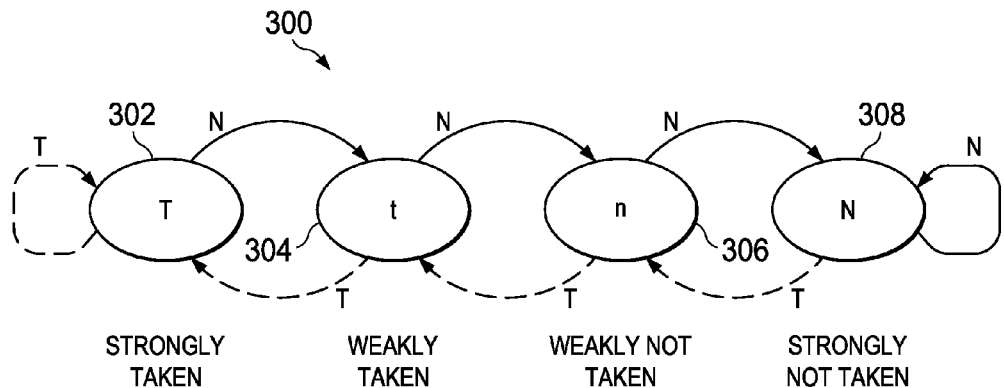
FIG. 3 is a diagram illustrating predictor states and state transitions in a traditional 2-bit branch predictor.

FIG. 3 is a diagram illustrating prediction states and state transitions in a traditional 2-bit branch predictor. The 2-bit value in each pattern history table entry determines the branch prediction for the incoming instruction. In the state machine diagram 300 in FIG. 3, T 302 represents the strongly taken state, t 304 represents the weakly taken state, n 306 represents the weakly not taken state, and N 308 represents the strongly not taken state. It should be noted that the saturation counter in the predictor either increments with each not-taken branch and saturates at a value of 11, or decrements with each taken branch and saturates at a value of 00.

Figure 4:
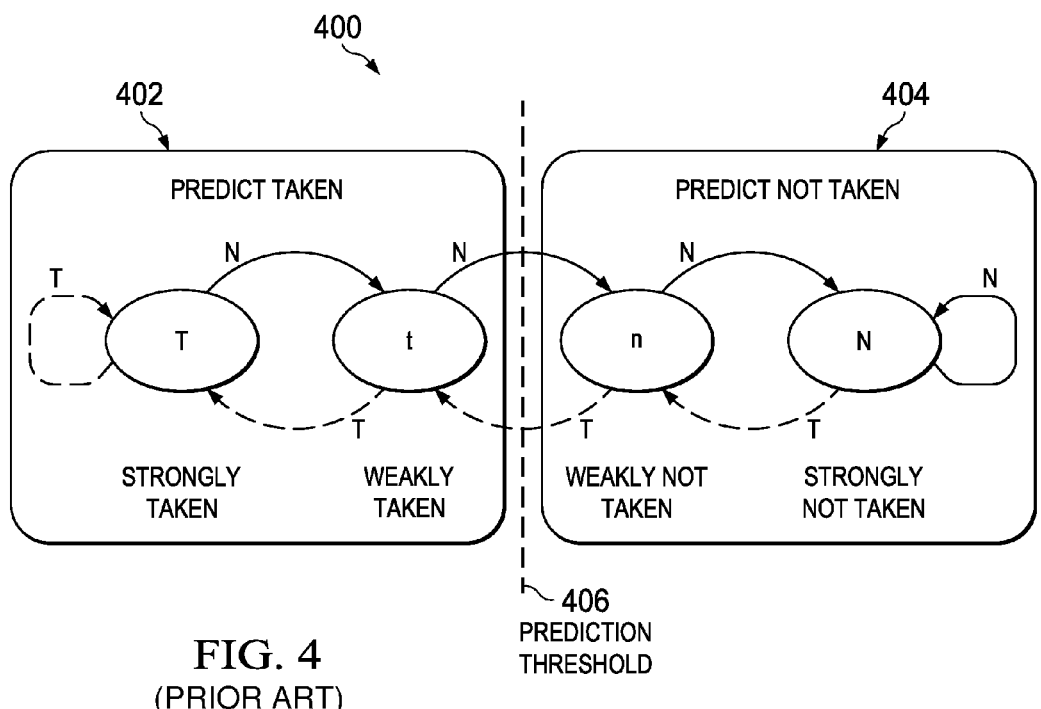
FIG. 4 is a diagram illustrating branch predictions and a prediction threshold in a traditional 2-bit branch predictor.

FIG. 4 is a diagram illustrating branch predictions and a branch prediction threshold in a traditional 2-bit branch predictor. In a traditional branch predictor scheme, state machine 400 is divided into two equal portions 402 and 404. Portion 402 represents the taken prediction side of the state machine, and portion 404 represents the not taken prediction side of the state machine. Prediction threshold 406 refers to the boundary between the different portions of the state machine that predict taken and that predict not taken.

To indicate whether or not a branch will be taken or not taken, the branch predictor uses two bits (or more) per pattern history table entry, rather than a single bit per pattern history table entry, to introduce inertia into the prediction process (the branch predictor always needs one bit per pattern history table entry to tell the prediction bits are for hysteresis). That is, the state, and therefore the prediction, is not flipped to a different result (e.g., taken to not taken) as soon as the first outcome, different from the current prediction, is seen. In other words, with two or more bits of state per pattern history table entry, once the prediction is strongly biased in one direction, at least two branch outcomes in the opposite direction are required to flip the predicted outcome. In the case of 2-bit saturation counters, if a prediction entry is saturated at 00 (e.g., strongly taken), two consecutive not taken outcomes are required for the branch predictor to start producing the not taken predictions.

While the traditional prediction threshold scheme in FIG. 4 allows for changing predictions based on the previous two branch outcomes, a problem with this traditional scheme is that the change in prediction may not accurately reflect a longer-term bias of the branch. For instance, in a traditional 2-bit branch predictor, if a branch, biased towards the strongly taken prediction, sees no more than two consecutive not taken outcomes before reverting to a sequence of taken outcomes, the branch suffers mispredictions for those two not taken outcomes. The two not taken outcomes move the prediction for the branch into the not taken portion 404 of the state machine and cause an extra misprediction on the next taken branch. This last mispredict occurs because the predictor is not aware of the longer-term tendency of the branch (the branch does not see more than two back-to-back not taken outcomes before reverting to the taken outcome). If the predictor was aware there are only two not taken outcomes, the predictor could have reverted back to predicting taken after the two not taken outcomes.

The embodiments of the disclosure provide a solution to the limitations of the traditional, fixed, prediction threshold associated with the states in the pattern history table entries by allowing the states in the state machine maintained by each pattern history table entry to be interpreted differently for each entry. In other words, the embodiments of the disclosure provides for dynamically altering the prediction threshold for each pattern history table entry by observing global tendencies of the branch (or branches) which index into that pattern history table entry. By altering the prediction threshold for each entry, the prediction provided by some of the states in an entry may also be redefined. As an example, a state that traditionally predicts not taken may effectively be modified to predict taken by moving the prediction threshold towards the states that predict not taken. Redefining the prediction threshold in this manner increases the inertia to move out of the states that correctly predict the direction the branch is biased towards, while simultaneously decreasing the inertia to move back into the states that correctly predict the direction the branch is biased towards.

A known solution to increasing the inertia of moving out of one type of prediction is to add more bits to the state. For instance, a 3-bit branch predictor allows for eight states, four of which predict taken and four predict not taken. However, adding more bits to the saturation counter increases the inertia in both directions, going from not taken to taken, or going from taken to not taken. Thus, allocating more bits to an entry does not result in the same benefits as altering the prediction threshold.

The embodiments of the disclosure provide several techniques to use in deciding when, in what direction, and by how much to move the prediction threshold in a pattern history table entry. In one embodiment, the prediction threshold is moved towards states that are least observed for a given branch. For example, in a 2-bit branch predictor, if it is observed that a branch rarely reaches the strongly not taken state, the prediction threshold is moved towards the strongly not taken state, effectively leading to three states that predict taken and only one state that predicts not taken. In another embodiment, a count is maintained for the number of correct predictions for different potential positions for the prediction threshold for each branch. For example, in a 2-bit branch predictor, there are three different positions for the prediction threshold. Periodically, the prediction threshold is moved to the position which the counters indicate as the one that would have generated the most accurate predictions. In another embodiment, the number of prediction state transitions that cross the prediction threshold in back to back transitions are observed. If this number is a large proportion of the overall transitions over a period of time, the prediction threshold is adjusted. The direction in which the prediction threshold is moved depends on the order in which the prediction threshold is crossed over back-to-back cycles. If the prediction threshold is more frequently crossed from a state in the taken to the not taken side first and then back from the not taken to the taken side, the threshold is moved closer to the not taken side, and vice versa. If both transition pairs are about equal in ratio (e.g., if the taken to not taken to taken, and the not taken to taken to not taken transition pairs are equally common), then the prediction threshold can be moved in either direction.

While the embodiments of the disclosure are described in the context of a branch predictor, the techniques provided in this disclosure are not limited to only predictors used for predicting branches, but may also be applied to any equivalent hardware predictor, such as predictors that use an n-bit saturation counter and predicts one of two elements based on prediction state. The adaptive prediction threshold scheme in the embodiments of the disclosure may also be used to improve the performance of traditional bimodal predictors and gshare predictors.

Figure 5A:
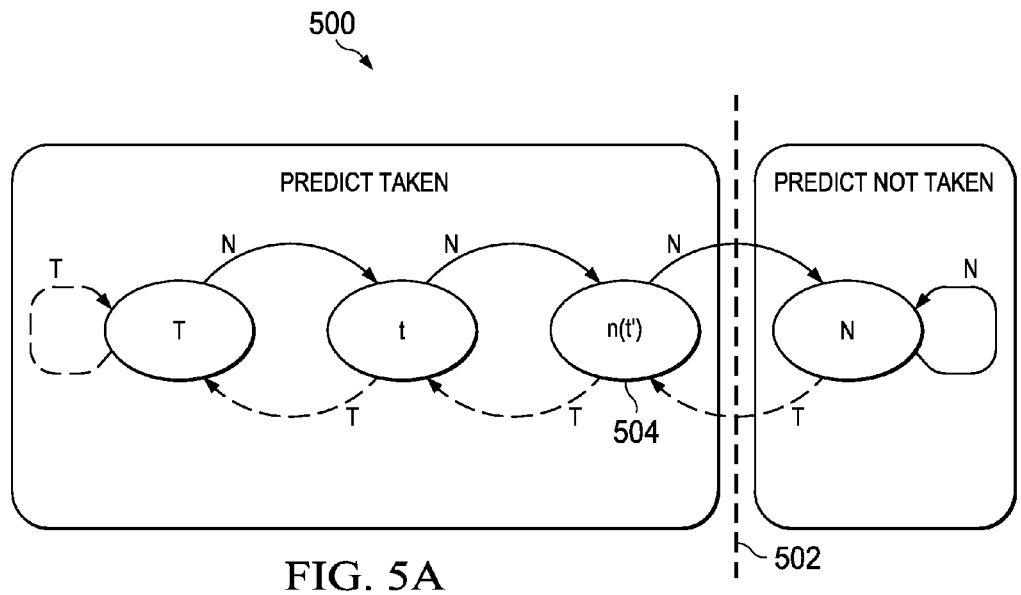
FIG. 5A is a diagram illustrating a prediction threshold biased towards the Taken prediction side of the state machine in accordance with the illustrative embodiments.
Figure 5B:
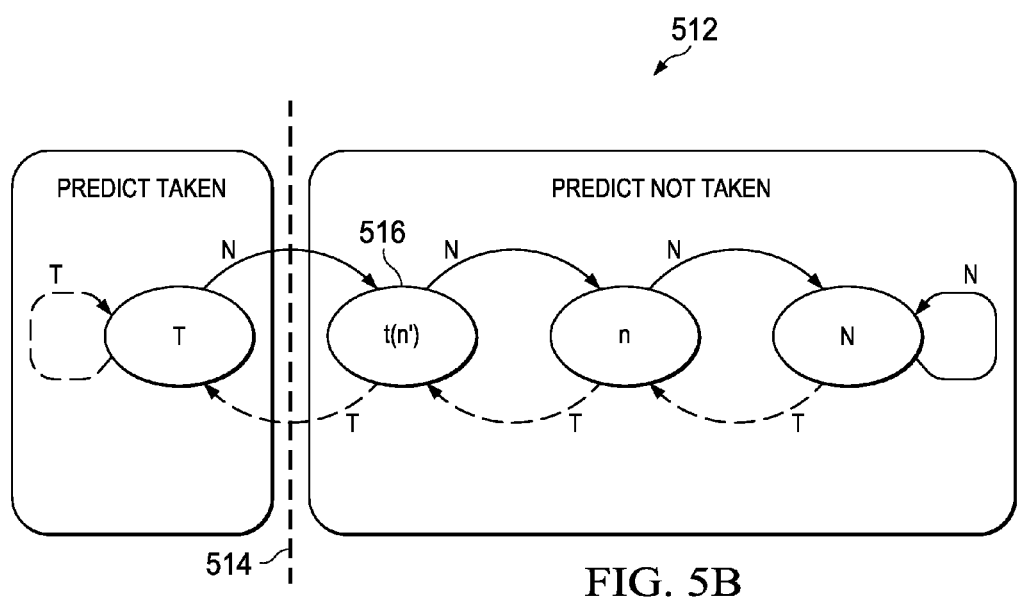
FIG. 5B is a diagram illustrating a prediction threshold biased towards the Not Taken prediction side of the state machine in accordance with the illustrative embodiments.

FIGS. 5A and 5B are diagrams illustrating a prediction threshold biased towards the taken prediction side of the state machine and a prediction threshold biased towards the not taken prediction side of the state machine, respectively. In contrast with the static location of the prediction threshold in traditional branch prediction schemes, the illustrative embodiments allow the branch predictor to adjust the prediction threshold for an entry in the pattern history table as needed to alter the prediction provided by some of the states in the entry. The predictor moves the threshold towards the taken side, that is, bias the threshold towards the not taken side, if the predicted branch has a greater tendency to be not taken. In this example, by moving the threshold towards the taken side, effectively three predictor states are interpreted to predict not taken. By symmetry, if the branch is observed to have a greater tendency to be taken, the prediction threshold is moved towards the not taken side, thus causing three predictor states to predict taken. The branch predictor may adjust the position of the prediction threshold for an entry in order to reduce the number of mispredictions that occur for the branch. Based on the outcomes observed for a branch, the branch predictor moves the prediction threshold to allow for increasing the accuracy of predictions for the branch.

In one embodiment, each entry in the pattern history table maintains both the prediction state and the prediction threshold position. Using the example of a 2-bit branch predictor, there are four possible states in which the predictor itself can be, and three locations in which the prediction threshold can be. Of these three locations for the prediction threshold, one location is the traditional location (e.g., dividing the state machine into two equal portions) and two locations are non-traditional (e.g., either biased towards the taken prediction or biased towards the not taken prediction).

In FIG. 5A, prediction threshold 502 has been adjusted to be biased towards the taken prediction. As prediction threshold 502 is shifted to the not taken side of state diagram 500, the weakly not taken state 504 represented as n may now be interpreted as a state t' that predicts a taken outcome. In contrast, in FIG. 5B, prediction threshold 514 has been adjusted to be biased towards the not taken prediction. As prediction threshold 514 is shifted to the taken side of state diagram 512, the weakly taken state 516 represented as t may now be interpreted as a state n' that predicts a not taken outcome.

Figure 6:
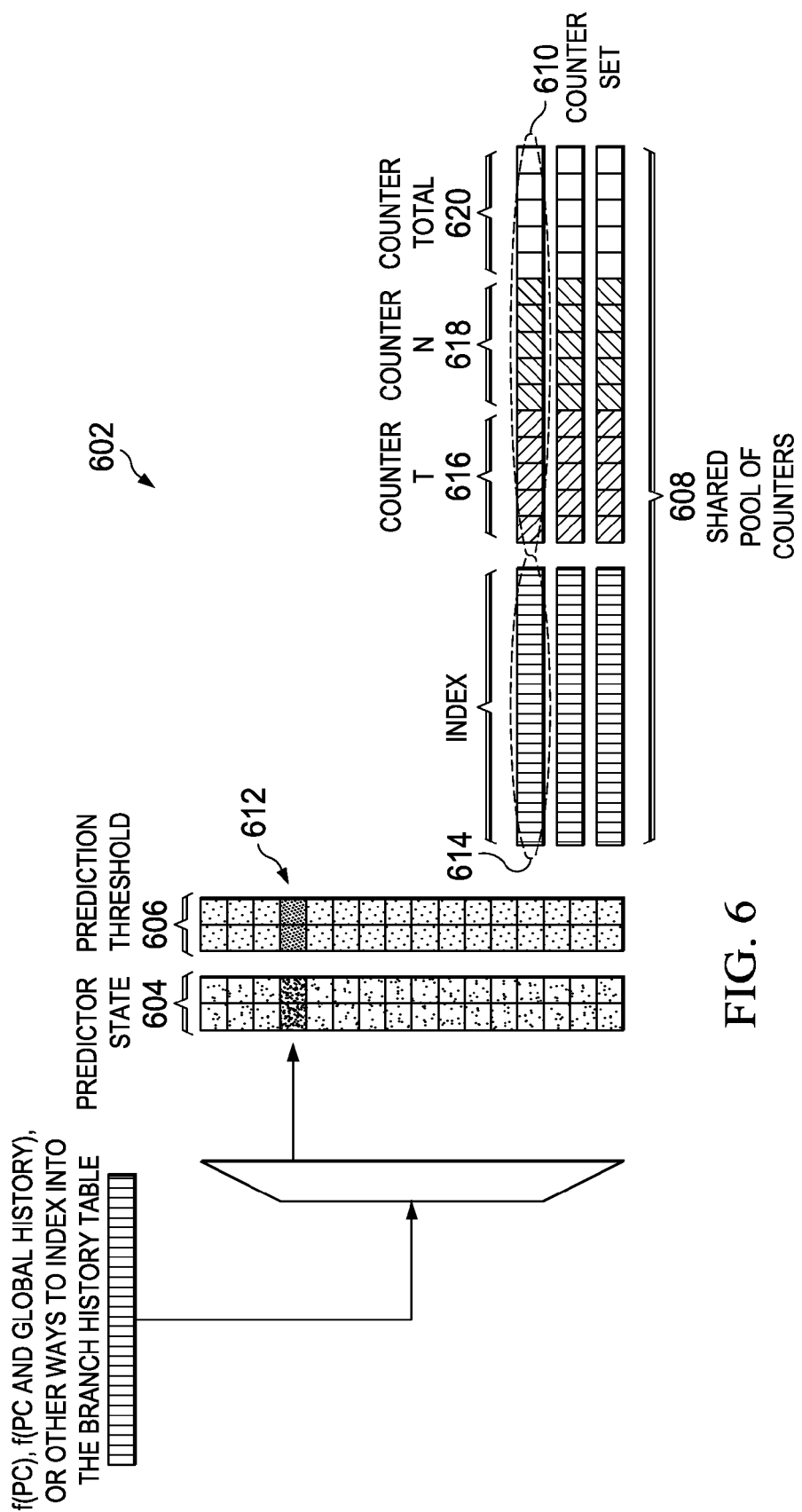
FIG. 6 is a diagram illustrating an exemplary branch prediction structure in accordance with one illustrative embodiment.

FIG. 6 is a diagram illustrating an exemplary structure of a pattern history table in accordance with one illustrative embodiment. The pattern history table structure in FIG. 6 allows for dynamically adjusting prediction thresholds towards prediction states that are least observed for a given branch.

Pattern history table 602 comprises entries that are each mapped to a particular branch instruction. Pattern history table 602 may be indexed, based on the particular predictor implementation used, by one or some combination of the following quantities—the program counter (PC) of the branch, the global history of the outcomes of some number of recent branches, and the local history of the outcomes of the previous occurrences of that particular branch. The program counter is a processor register that indicates where the processor is in its instruction sequence. The global history comprises the recent history of every branch executed and is maintained in a single shift register, or global history register (GHR). Global history predictors (e.g., gselect or gshare) may generate the index by combining bits from the program counter and the global history register. The local history comprises the recent history of a particular branch which is maintained in a single shift register, or local history register (LHR). Local history predictors may generate the index by combining bits from the program counter and the local history register.

Pattern history table 602 comprises saturating counters 604 and 606. In this example, saturating counters 604 and 606 are two bits long. Saturating counters 604 are used to reflect the current branch prediction state for each entry in the table. Saturating counters 604 increase or decrease according to the actual outcome of the corresponding branch instruction. For each taken branch, the appropriate counter is incremented. Likewise, for each not taken branch, the appropriate counter is decremented. Saturating counters 606 are used to represent the prediction threshold position of a branch prediction for an entry.

Pattern history table 602 also comprises shared pool of counters 608. Shared pool of counters 608 are used to evaluate branch biases and update prediction thresholds based on actual branch outcome data. Saturating counters 606 representing the prediction threshold positions of entries in pattern history table 602 increase or decrease based on an evaluation of the values in shared pool of counters 608. Counters 608 in the shared pool operate in groups of three, wherein each group comprises a set of counters. A counter set, such as counter set 610, is associated with one entry in pattern history table 602, such as entry 612. Counter set 610 observes the predictions and the actual outcomes for the branch (or branches) corresponding to the associated entry 612 over a period of time.

Counter set 610 comprises index bits 614, Counter T 616, Counter N 618, and Counter Total 620. Index bits 614 may be used to identify entry 612 with which the set is associated. Counter T 616 keeps a count of the number of times associated entry 612 is found in the strongly taken state after the actual outcome is known and the appropriate state transition for entry 612 has been completed. Counter N 618 keeps a count of the number of times associated entry 612 is found in the strongly not taken state after the actual outcome is known and the appropriate state transition for associated entry 612 has been completed. Counter Total 620 keeps a count of the total accesses to associated entry 612.

Once Counter Total 620 saturates, the branch predictor may determine, based on the count values in Counter T 616 and Counter N 618, to either move the prediction threshold in the appropriate direction or to leave the prediction threshold in its current location. For example, the branch predictor may compare the value in Counter T 616 against the value in Counter N 618. If the value in Counter N 618 is greater than the value in Counter T 616, the branch predictor modifies the prediction threshold counter value in saturating counter 606 to reflect the prediction threshold biased towards the not taken state. The prediction threshold counter value in saturating counter 606 redefines the meaning of the associated state counter value in saturating counter 604. For example, with the prediction threshold biased towards the not taken state, there are more state counter values which are associated with the taken prediction than would be if the prediction threshold were not biased.

In one embodiment, the number of counter sets maintained for evaluating branch biases and updating prediction thresholds may be some fraction of the number of entries in pattern history table 602, such as, for example, one counter set for every 16 pattern history table entries. Each counter set is responsible for evaluating a group of pattern history table entries (16 entries in the above example) and the counter set periodically associates itself with one of the entries in the group of entries. The counter sets in the shared pool of counters 608 may be allocated in various ways. For example, there are various design choices that exist when a counter set 610 moves from observing one entry to the next entry, such as after achieving saturation, after a fixed number of cycles, etc. If the branch predictor determines that a certain pattern history table entry with which counter set 610 is currently associated is rarely being accessed such that it takes a long time for counters 620 to saturate, the branch predictor may override the usual policy of freeing counter set 610 from allocation to the entry upon a counter saturation, and instead free counter set 610 after a fixed number of clock cycles. Similarly, various design choices exist for the order in which a counter set associates itself with the pattern history table entries (e.g., cyclic, random, demand based, etc.). If the branch predictor determines that certain pattern history table entries are accessed more frequently than other entries in the pattern history table and therefore are more likely to require prediction threshold adjustments, these pattern history table entries may be given priority when counter sets are assigned to the pattern history table entries. Likewise, various design choices exist for how the counter sets and pattern history table entries are paired (e.g., any to any, partitioned, etc.). When a counter set has evaluated a pattern history table entry for potential threshold adjustments, the individual counters in counter set 610 are reset to 0, and are, likely, reassigned to another pattern history table entry.

The size of each counter (counter T 616, N 618, and Total 620) in counter set 610 in this illustrative example is shown to be 5 bits; however, the illustrative embodiments may be implemented with other numbers of bits per counter. For instance, acceptable performance improvements may also be achieved with 4 bits per counter. The number of bits used per counter should, however, be chosen carefully; with too many bits, it may take a long time for Counter Total 620 to saturate, and with too few bits, there may be unnecessarily frequent updates to the predictor threshold value in saturating counter 606. The optimum counter size may be appropriately discovered based on design and performance constraints. In addition, although three counters per counter set are shown in this example, it may be feasible to design a robust system with fewer counters. For example, two counters per counter set may be appropriate if one of the counters counts the transitions to the strongly taken state, the other counter counts the transitions to the strongly not taken state, and the decision to move the prediction threshold is made when either of the two counters saturate.

Figure 7:
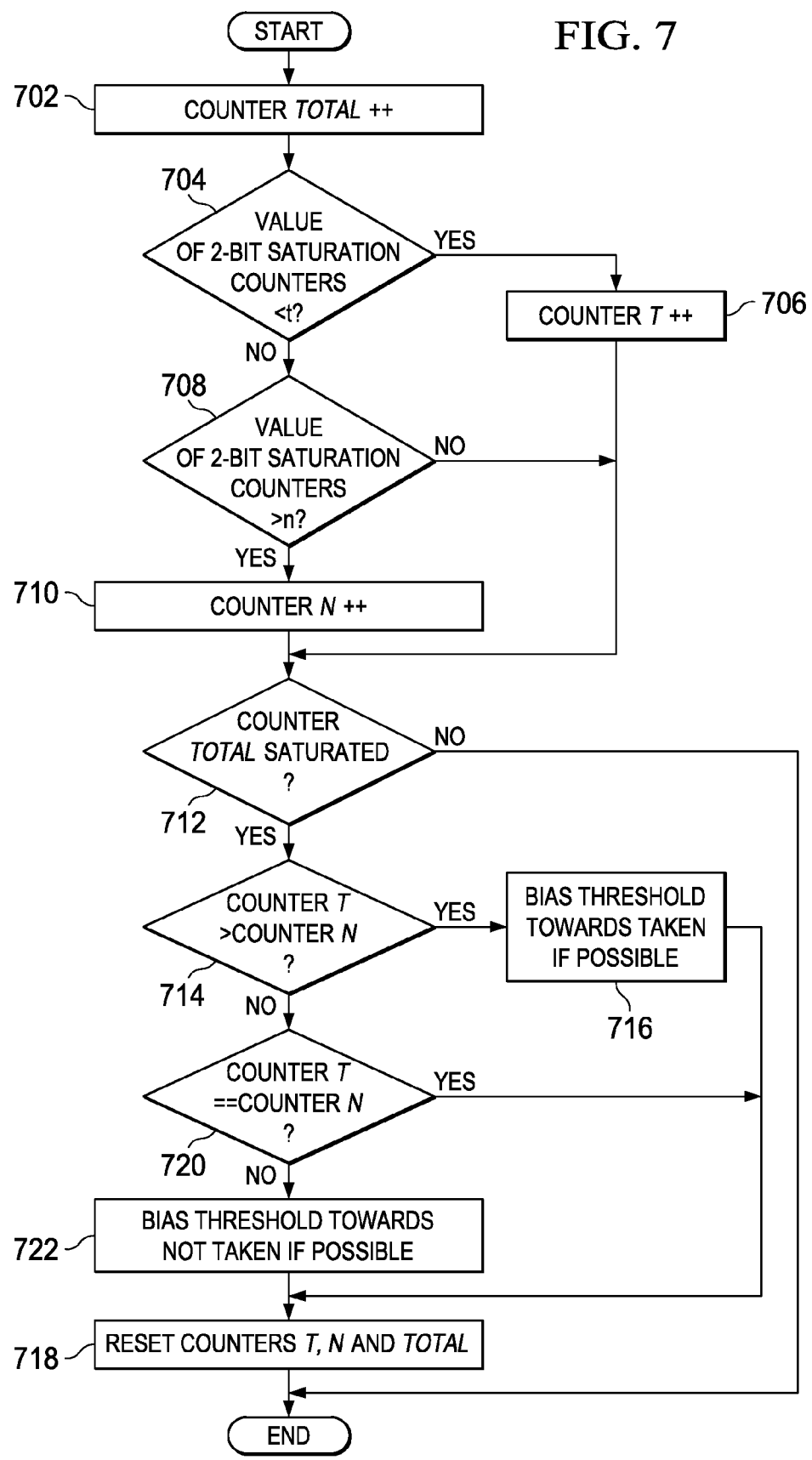
FIG. 7 is a flowchart of a process describing how the prediction thresholds and counter values are adjusted with the adaptive prediction scheme in accordance with one illustrative embodiment.

FIG. 7 is a flowchart of a process describing how the prediction thresholds and counter values are dynamically adjusted using the adaptive prediction scheme in FIG. 6. The process described in FIG. 7 may be implemented by a branch predictor in branch prediction unit 117 in FIG. 1.

In response to an entry being accessed in the pattern history table, the process begins with the branch prediction logic incrementing the counter total in the counter set allocated to an entry in the pattern history table to reflect the access to the entry (step 702). The branch prediction logic then makes a determination as to whether the value of the 2-bit prediction state saturation counter for the entry in the pattern history table is less than the value corresponding to a weakly taken prediction state "t" (step 704). In other words, the logic determines if the 2-bit counter value indicates a prediction state of strongly taken (T). If the value of the 2-bit prediction state saturation counter for the entry is less than the value corresponding to the weakly taken prediction state "t" ('yes' output of step 704), the branch prediction logic increments the value in counter T in the counter set allocated to the entry in the pattern history table (step 706), and continues to step 712. The logic increments counter T because counter T counts the number of times the predictor was in a stronger state than the weakly taken "t" state when making a prediction (under the assumed predictor state assignments, any state with a value less than that of state "t" is considered a strongly taken state).

In this particular example with four states, the only state which corresponds to counter T is the T, strongly taken, state.

However, if the value of the 2-bit prediction state saturation counter for the entry is not less than the value corresponding to the weakly taken prediction state "t" ('no' output of step 704), the branch prediction logic makes a determination as to whether the value of the prediction state saturation counters for the entry is greater than the value corresponding to a weakly not taken prediction state "n" (step 708). In other words, the logic determines if the 2-bit counter value indicates a prediction state of strongly not taken (N). If the value of the 2-bit prediction state saturation counter for the entry is not greater than the value corresponding to the weakly not taken prediction state "n" ('no' output of step 708), the process continues to step 712.

However, if the value of the 2-bit prediction state saturation counter for the entry is greater than the value corresponding to the weakly not taken prediction state "n" ('yes' output of step 708), the branch prediction logic increments the value in counter N in the counter set allocated to the entry in the pattern history table (step 710), and continues to step 712. The logic increments counter N because counter N counts the number of times the predictor was in a weaker state than the weakly not taken "n" state when making a prediction (under the assumed predictor state assignments any state with a value greater than that of state "n" is considered a strongly not taken state). In this particular example with four states, the only state which corresponds to counter N is the N, strongly not taken, state.

At step 712, the branch prediction logic makes a determination as to whether counter Total in the counter set allocated to the entry has saturated. If counter Total has not saturated ('no' output of step 712), the process terminates thereafter. However, if counter Total has saturated ('yes' output of step 712), the branch prediction logic makes a determination as to whether the count value in counter T is greater than the count value in counter N (step 714).

If the count value in counter T is greater than the count value in counter N ('yes' output of step 714), the branch prediction logic knows that the predictions for the branch are biased towards the taken side of the state machine. Consequently, the branch prediction logic adjusts the prediction threshold of the entry towards the taken prediction state by changing the counter value in the 2-bit prediction threshold saturating counter (step 716). The 2-bit prediction threshold saturating counter may be incremented (assuming a larger value of the threshold counter indicates its moving towards the not taken states, thus biasing the predictor towards the taken prediction). Once the prediction threshold is adjusted, the branch prediction logic resets the values in the counter set (i.e., in counters T, N, and Total) (step 718), with the process terminating thereafter.

Turning back to step 714, if the count value in counter T is not greater than the count value in counter N ('no' output of step 714), the branch prediction logic then makes a determination as to whether the count value in counter T is equal to the count value in counter N (step 720). If the count value in counter T is equal to the count value in counter N ('yes' output of step 720), the branch prediction logic knows that the predictions for the branch are unbiased. Consequently, the branch prediction logic does not adjust the prediction threshold and resets the values in the counter set (i.e., in counters T, N, and Total) (step 718), with the process terminating thereafter.

Turning back to step 720, if the count value in counter T is not equal to the count value in counter N ('no' output of step 720), the branch prediction logic knows that the predictions for the branch are biased towards the not taken side of the state machine. Consequently, the branch prediction logic adjusts the prediction threshold of the entry towards the not taken prediction state by changing the counter value in the 2-bit prediction threshold saturating counter (step 722). The 2-bit prediction threshold saturating counter may be decremented (assuming a smaller value of the threshold counter indicates its moving towards the taken states, thus biasing the predictor towards the not taken prediction). Once the threshold is adjusted, the branch prediction logic resets the values in the counter set (i.e., in counters T, N, and Total) (step 718), with the process terminating thereafter.

Figure 8:
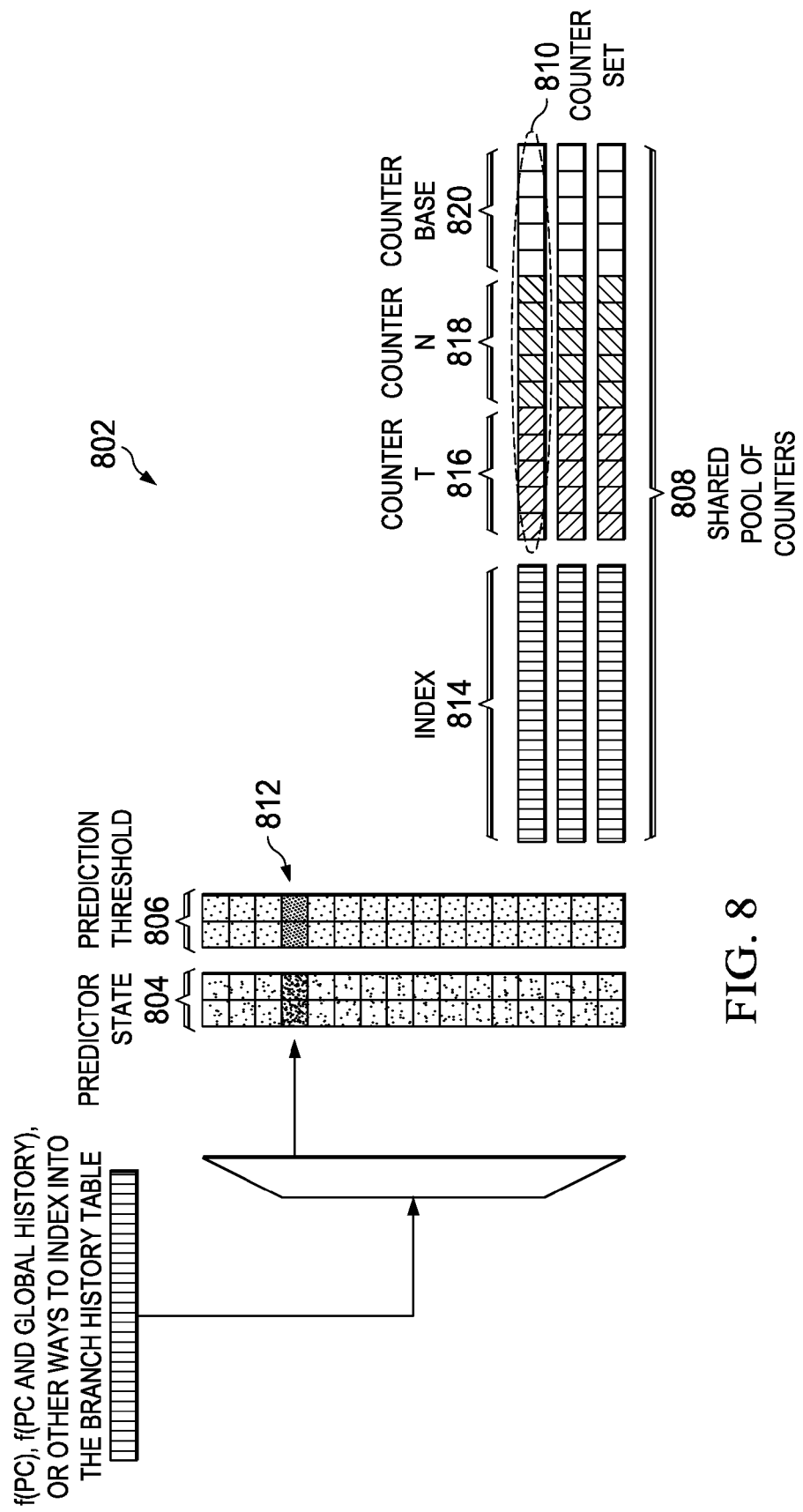
FIG. 8 is a diagram illustrating an exemplary branch prediction structure in accordance with another illustrative embodiment.

FIG. 8 is a diagram illustrating an exemplary branch prediction structure in accordance with another illustrative embodiment. The branch prediction structure described in FIG. 8 is similar to the branch prediction structure in FIG. 6, except that the counters in the set of counters are being used to count the number of correct predictions for the various potential positions in which the prediction threshold could have been. The pattern history table structure in FIG. 8 allows for dynamically adjusting prediction threshold locations towards prediction states that are determined to provide the best accuracy.

Pattern history table 802 comprises 2-bit saturating counters (e.g., counters 804 and 806) that are used to represent the prediction states and the prediction thresholds for a branch prediction, respectively. Pattern history table 802 may be indexed by the program counter of the branch, the global history of the outcomes of some number of recent branches, the local history of the outcomes of the previous occurrences of that particular branch, or any combination of the above. Saturating counters 804 increase or decrease according to the actual outcome of the corresponding branch instruction. Saturating counters 806 increase or decrease based on the evaluation of shared pool of counters 808.

Shared pool of counters 808 in pattern history table 802 are used to evaluate branch biases and update prediction thresholds based on actual branch outcome data. Counter set 810 is allocated to an entry in pattern history table 802, such as entry 812. Counter set 810 observes the predictions and the actual outcomes for the branch (or branches) corresponding to the associated entry 812 over a period of time. Counter set 810 comprises index bits 814, counter T 816, counter N 818, and counter Total 820. Index bits 814 may be used to identify entry 812 with which the set is associated. Counter T 816 keeps a count of the correct number of predictions that were made for entry 812 with the prediction threshold biased towards the taken prediction. Counter N 818 keeps a count of the correct number of predictions that were made for entry 812 with the prediction threshold biased towards the not taken prediction. Counter base 820 keeps a count of the correct number of predictions that were made for entry 812 with the prediction threshold unbiased (in its traditional location in the state machine). The branch prediction logic at periodic intervals determines which of the prediction threshold locations (e.g., unbiased, biased towards the taken prediction, or biased towards the not taken prediction) has the highest count value and thus is determined to provide the highest prediction accuracy. The branch prediction logic may update the prediction threshold for entry 812 based on the prediction accuracies determined for the associated set of counters 810. For example, when one of the three counters saturates, the prediction threshold position corresponding to that counter is implemented. If Counter N saturates before the other two counters, the prediction threshold counter value is modified to reflect the predictor threshold biased towards the not taken state.

Figure 9:
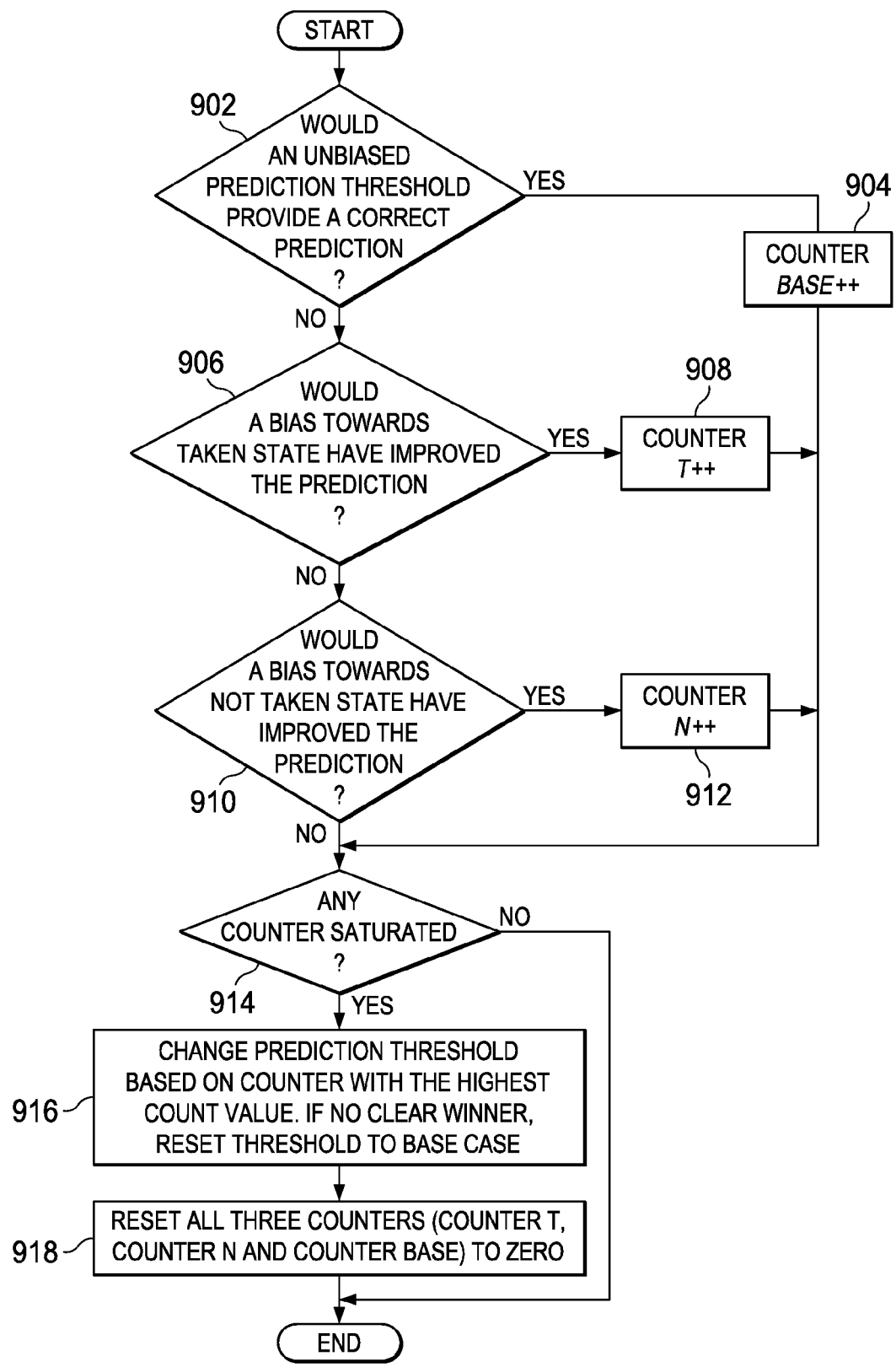
FIG. 9 is a flowchart of a process describing how the prediction thresholds and counter values are adjusted with the adaptive prediction scheme in accordance with another illustrative embodiment.

FIG. 9 is a flowchart of a process describing how the prediction thresholds and counter values are adjusted using the adaptive prediction scheme in FIG. 8. The process described in FIG. 9 may be implemented by a branch predictor in branch prediction unit 117 in FIG. 1.

The process begins with the branch prediction logic making a determination as to whether an unbiased prediction threshold for an entry in the pattern history table would provide an accurate branch prediction for the entry (step 902). This determination may be made when the correct branch direction is available. At this time, the bits in the prediction state counter in the pattern history table are also updated. For example, if the state counter was in the weakly not taken (n) state and the branch was actually taken, the state counter is updated to the weakly taken (t) state.

If an unbiased prediction threshold for the entry in the pattern history table would provide an accurate branch prediction for the entry ('yes' output of step 902), the branch prediction logic increments the value in the counter Base in the counter set allocated to the entry in the pattern history table (step 904), and continues to step 914. However, if an unbiased prediction threshold for an entry in the pattern history table would not provide an accurate branch prediction for the entry ('no' output of step 902), the branch prediction logic determines whether a prediction threshold biased towards the taken state for the entry would have improved the accuracy of the branch prediction for the entry (step 906). If a prediction threshold biased towards the taken state for the entry would have improved the accuracy of the branch prediction for the entry ('yes' output of step 906), the branch prediction logic increments the value in the counter T in the counter set allocated to the entry in the pattern history table (step 908), and continues to step 914.

Turning back to step 906, if a biased prediction threshold towards the taken state for an entry would not have improved the accuracy of the branch prediction for the entry ('no' output of step 906), the branch prediction logic determines whether a prediction threshold biased towards the not taken state for the entry would have improved the accuracy of the branch prediction for the entry (step 910). If a prediction threshold biased towards the not taken state for the entry would have improved the accuracy of the branch prediction for the entry ('yes' output of step 910), the branch prediction logic increments the value in counter N in the counter set allocated to the entry in the pattern history table (step 912), and continues to step 914.

Turning back to step 910, if a prediction threshold biased towards the not taken state for the entry would not have improved the accuracy of the branch prediction for the entry ('no' output of step 910), the process continues to step 914.

At step 914, the branch prediction logic determines whether any of the three counters in the set of counters allocated to the entry has saturated. If none of the three counters in the set of counters allocated to the entry has saturated ('no' output of step 914), the process terminates thereafter. However, if any of the three counters in the set of counters allocated to the entry has saturated ('yes' output of step 914), the branch prediction logic adjusts the prediction threshold of the entry based on the counter in the set of counters that has the highest count value (i.e., the counter reflecting the most accurate predictions) (step 916). The branch prediction logic may adjust the prediction threshold of the entry by increasing or decreasing, as the case may be, the 2-bit prediction threshold saturating counter in the entry in the pattern history table. The prediction threshold is moved towards prediction states that are determined, from the values in the set of counters, to provide the best accuracy. If multiple counters have the highest value, the logic may reset the prediction threshold location for the entry to the base threshold location in accordance with counter Base. The branch prediction logic may then reset all of the counters in the set of counters associated with the entry to 0 (step 918).

Another illustrative embodiment of the disclosure may be implemented using the same branch prediction structure shown in FIG. 6 or FIG. 8. The different embodiments differ in what the counters in the shared set of counters are being used to count. For example, in FIG. 6, the counters in the set of counters are used to count the total prediction and number of times the predictor was in the strongly not taken (N) state or the strongly taken (T) state. In FIG. 8, the same counters in the set of counters are used to predict the number of correct predictions if the prediction threshold were in one of the three possible locations it could be in. In a third embodiment, the same counters in the set of counters are used to calculate the total number of predictions, the number of times the prediction caused the prediction state to move from the left to the right of the prediction threshold, and the number of times the prediction caused the prediction state to move from the right to the left of the prediction threshold.

The third embodiment takes advantage of fundamental observations in terms of transitions that repeatedly cross the prediction threshold in back-to-back state transitions. In essence, the adaptive prediction threshold scheme attempts to move the prediction threshold out of the way of a branch's transitions. Using the example diagram in FIG. 3, it may be observed that if a majority of the total state transitions experienced by a 2-bit branch predictor over a certain period of time move from the weakly taken to the weakly not taken state, only to immediately move back from the weakly not taken to the weakly taken state in the next transition, there are two branch mispredictions that occur. If the prediction threshold is adjusted to avoid the state transitions from moving across the threshold line, one of the two predictions can be corrected. Similarly, using the example diagram of FIG. 4, it may be observed that adjusting the prediction threshold towards either the strongly taken or the strongly not taken state reduces the number of times the prediction threshold is crossed.

Taking advantage of these observations, the hardware (e.g., the shared set of counters) may keep a count of the direction in which the back-to-back threshold crossings occur, and the total state transitions that occur over a period of time. If the back-to-back threshold crossings are a significant proportion of the total state transitions, the prediction threshold is moved. A significant proportion may be comprise, for example, greater than 50% of the total state transitions, or a value of counter T/counter N=2. The direction the prediction threshold is moved in may depend on the order of the back-to-back threshold crossings. If there are more crossings that move from one of the taken states to the not taken states first, and then immediately transition back to the taken states, the prediction threshold should be moved towards the not taken side, and vice versa, to reduce the number of times the prediction threshold is crossed. If both state transition pairs are about equal in ratio, that is, if the taken to not taken to taken, and the not taken to taken to not taken transition pairs are equally common, the prediction threshold may be moved in either direction of the state machine.

FIGS. 10A-10E illustrate example scenarios how a 2-bit branch predictor with a prediction threshold biased towards the taken prediction side of the state machine compares to a traditional 2-bit branch predictor with an unbiased prediction threshold in accordance with the illustrative embodiments. Each scenario in FIGS. 10A-10E comprises a table with four columns and a state transition diagram. The state transition diagram shows the inherent bias in the branch under consideration by highlighting the prediction states actually visited by that branch (e.g., taken and weakly taken). The state transition diagram also illustrates a biased predictor in that the prediction threshold is biased towards the taken side of the state machine.

In table 1000, the first column 1004 identifies the actual taken and not taken outcomes for a given branch over a period of time. The second column 1006 and third column 1008 in table 1000 comprise prediction states in accordance with the adaptive prediction scheme described in the illustrative embodiments. In particular, second column 1006 shows the beginning prediction in the state machine for an entry in the pattern history table, or begin state. In this example, the begin state indicates the predicted branch direction for the biased predictor. The second column also reflects whether each prediction was a correct prediction or an incorrect prediction. The third column 1008 in table 1000 shows the state entered by the predictor after the prediction, or end state. The fourth column 1010 in table 1000 comprises prediction states in accordance with traditional prediction schemes. The fourth column 1010 identifies the predictions that an unbiased predictor (e.g., with the prediction threshold in the center, as shown in FIG. 4) would have made.

The rows of the table highlighted with the dotted rectangle form the steady state 1012 of the pattern in each example. Steady state is a sequence of prediction patterns and actual branch outcome patterns that repeats for a substantial number of future instructions. Any prediction improvement to such a sequence of branches proportionally benefits all the repeated instances of the sequence. A comparison of the ratio of correct to incorrect predictions within steady state 1012 illustrates the benefit of the proposed scheme. In the example in FIG. 10A, the ratio of correct to incorrect predictions within steady state 1012 is the same, regardless of whether the prediction threshold is moved toward the taken side as shown in state transition diagram 1002. Consequently, in this particular case, a determination may be made that there is no difference in prediction performance between the unbiased prediction threshold and the biased prediction threshold.

Figure 10A:
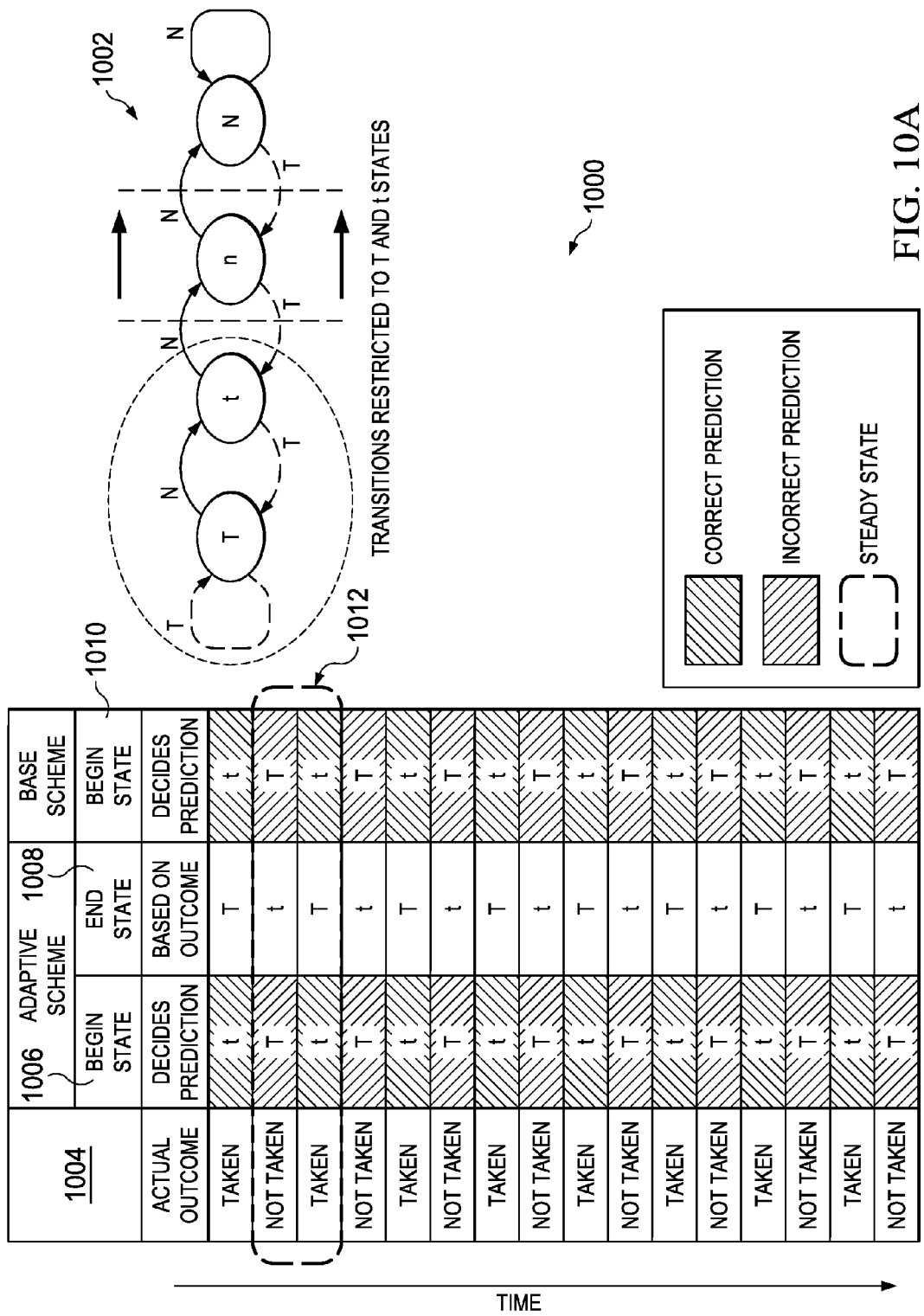
FIGS. 10A-10E illustrate example scenarios how a 2-bit predictor with a prediction threshold biased towards the Taken prediction side of the state machine compares to a traditional 2-bit predictor with an unbiased prediction threshold in accordance with the illustrative embodiments.
Figure 10B:
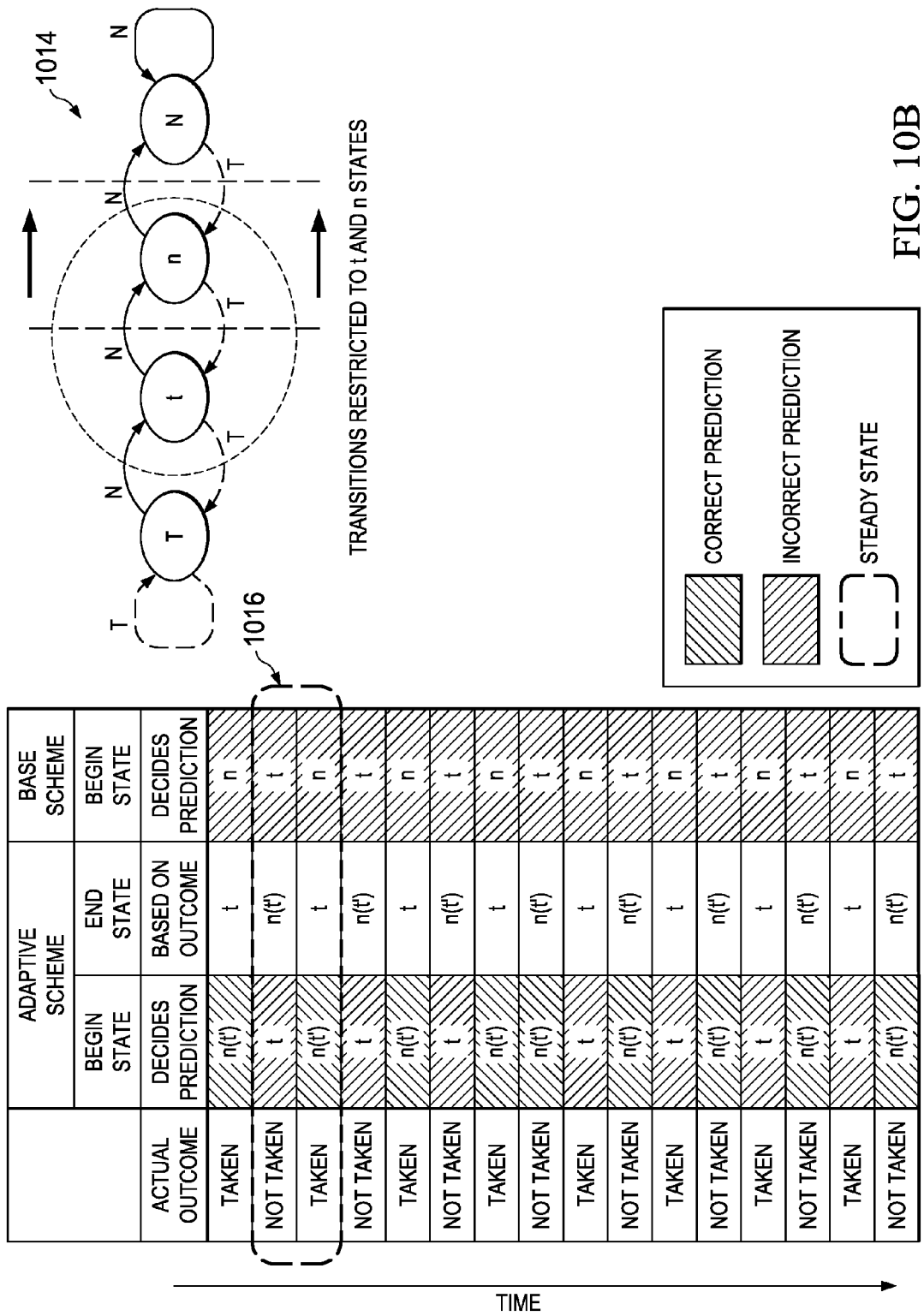

In the example in FIG. 10B, state transition diagram 1014 illustrates a biased predictor where the prediction threshold is biased towards the taken side of the state machine and highlights the prediction states actually visited by that branch (e.g., weakly taken and weakly not taken). The ratio of correct to incorrect predictions within steady state 1016 is not the same, as the predictions made using the adaptive scheme of the illustrative embodiments with the prediction threshold moved toward the taken side as shown in state transition diagram 1014 provides an improvement in correct predictions. Consequently, in this particular case, a determination may be made that there is the biased prediction threshold provides better prediction results than the unbiased prediction threshold.

Figure 10C:
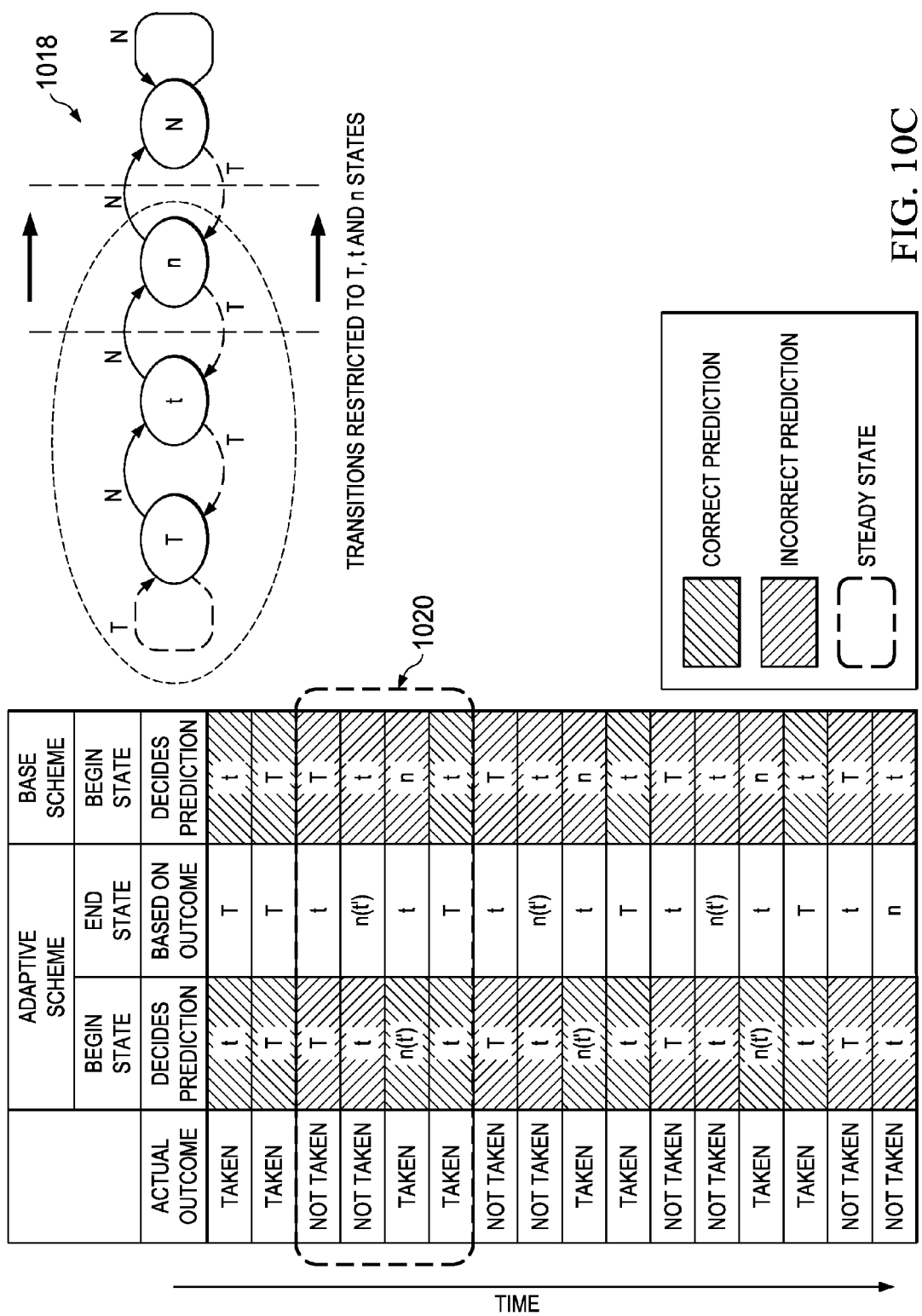

In the example in FIG. 10C, state transition diagram 1018 also illustrates a biased predictor where the prediction threshold is biased towards the taken side of the state machine diagram and highlights the prediction states actually visited by that branch (e.g., taken, weakly taken, and weakly not taken). The ratio of correct to incorrect predictions within steady state 1020 shows that more correct predictions are made using a biased prediction threshold than with an unbiased prediction threshold. Thus, the adjustment of the prediction threshold towards the taken side results in an improvement in correct predictions.

Figure 10D:
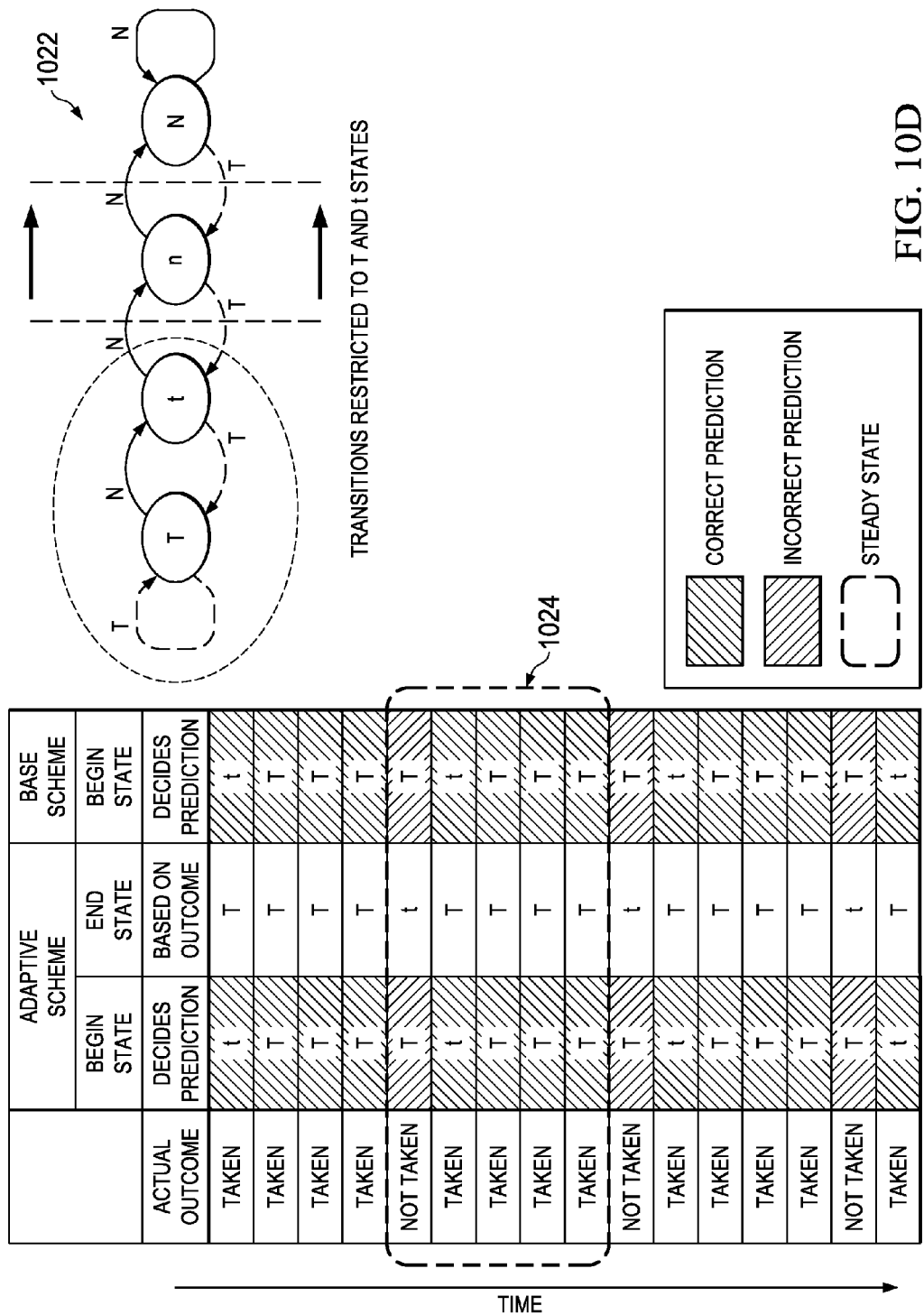

In the example in FIG. 10D, the ratio of correct to incorrect predictions within steady state 1024 is the same, regardless of whether the prediction threshold is biased toward the taken side as shown in state transition diagram 1022. Consequently, in this particular case, a determination may be made that there is no difference in prediction performance between the unbiased prediction threshold and the biased prediction threshold.

Figure 10E:
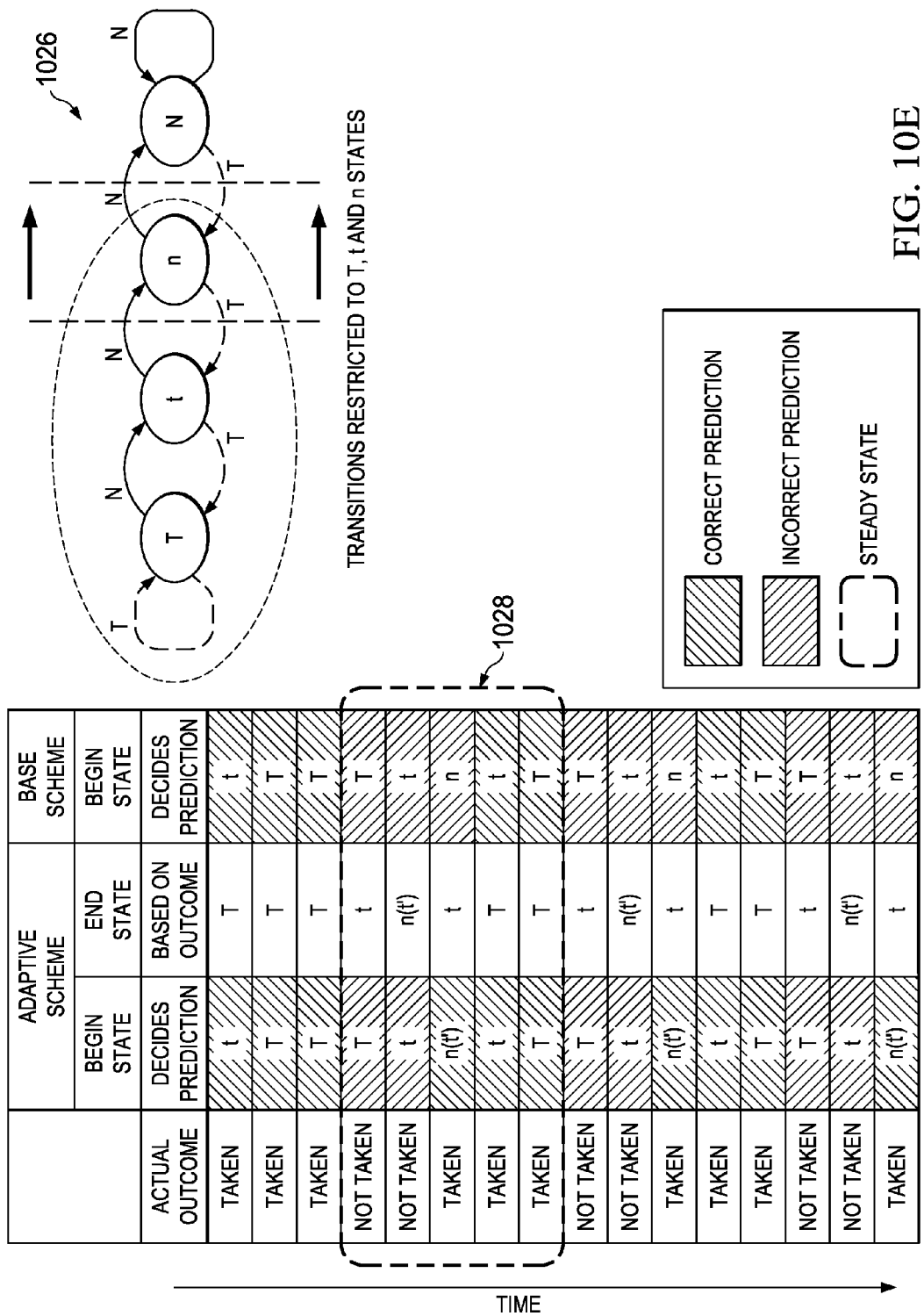

In the example in FIG. 10E, state transition diagram 1026 illustrates a biased predictor where the prediction threshold is biased towards the taken side of the state machine and highlights the prediction states actually visited by that branch (e.g., taken, weakly taken, and weakly not taken). The ratio of correct to incorrect predictions within steady state 1028 shows that more correct predictions are made using a biased prediction threshold than with an unbiased prediction threshold.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dynamically adapting a prediction threshold for an entry in a pattern history table, the computer implemented method comprising:
    obtaining a count value of a prediction state counter in an entry in a pattern history table, wherein the count value represents a prediction state of a prediction state machine for the entry;
    changing one or more count values in a set of counters allocated to the entry in the pattern history table based on the count value of the prediction state counter in the entry; and
    adjusting a prediction threshold of the prediction state machine for the entry based on an analysis of the changed one or more count values in the set of counters, wherein the prediction threshold is adjusted by changing a count value in a prediction threshold counter in the entry in the pattern history table, and wherein adjusting the prediction threshold redefines predictions provided by the prediction state machine.

2. The computer implemented method of claim 1, wherein the prediction threshold comprises a boundary in the prediction state machine between states that predict taken and states that predict not taken.

3. The computer implemented method of claim 1, wherein the pattern history table comprises a prediction state counter and a prediction threshold counter for each entry, and a pool of counters.

4. The computer implemented method of claim 1, wherein the prediction state counter and the prediction threshold are n-bit saturating counters, wherein n is two or more bits, and wherein the prediction state counter comprises a count value that increases or decreases according to an actual outcome of a corresponding branch instruction.

5. The computer implemented method of claim 1, wherein the pattern history table comprises entries that are each mapped to a particular branch instruction, and wherein the pattern history table is indexed by at least one of a program counter of a branch, a global history of outcomes of a number of previous branches, or a local history of outcomes of previous occurrences of a particular branch.

6. The computer implemented method of claim 1, wherein the set of counters allocated to the entry are used to observe predictions and actual outcomes for a branch instruction corresponding to the entry over a period of time.

7. The computer implemented method of claim 1, wherein adjusting a prediction threshold of the prediction state machine further comprises:
    incrementing a first counter in the set of counters allocated to the entry each time a prediction is made;
    incrementing one of a second counter or a third counter in the set of counters, wherein the second counter is incremented when the count value of the prediction state counter in the entry indicates a prediction of strongly taken, and wherein the third counter is incremented when the count value of the prediction state counter in the entry indicates a prediction of strongly not taken;
    responsive to a determination that the first counter has saturated, comparing a current count value in the second counter to a current count value in the third counter;
    responsive to a determination that the current count value in the second counter is less than the current count value in the third counter, adjusting the prediction threshold towards a strongly taken prediction state of the prediction state machine; and
    responsive to a determination that the current count value in the second counter is greater than the current count value in the third counter, adjusting the prediction threshold towards a strongly not taken prediction state of the prediction state machine.

8. The computer implemented method of claim 7, further comprising:
    resetting all counters in the set of counters to an initial value.

9. The computer implemented method of claim 1, wherein adjusting a prediction threshold of the prediction state machine further comprises:
    incrementing one of a first counter, a second counter, or a third counter in the set of counters, wherein the first counter is incremented upon a determination that an unbiased prediction threshold provides an accurate prediction for the entry, wherein the second counter is incremented upon a determination that a biased prediction threshold towards the strongly taken prediction state improves the prediction for the entry, and wherein the third counter is incremented upon a determination that a biased prediction threshold towards the strongly not taken prediction state improves the prediction for the entry;

determining that a counter in the set of counters has saturated;

determining the counter in the set of counters that has a highest count value; and adjusting the prediction threshold towards the prediction state having the highest count value in the set of counters.

10. The computer implemented method of claim 9, further comprising:

resetting all counters in the set of counters to an initial value.

11. The computer implemented method of claim 1, wherein adjusting a prediction threshold of the prediction state machine further comprises:

incrementing a first counter in the set of counters allocated to the entry each time a prediction is made;

incrementing one of a second counter or a third counter in the set of counters, wherein the second counter is incremented to indicate a number of times the prediction caused the prediction state in the prediction state counter to move from a state which predicts not taken to a state which predicts taken, and wherein the third counter is incremented to indicate a number of times the prediction caused the prediction state in the prediction state counter to move from a state which predicts taken to a state which predicts not taken;

responsive to a determination that the first counter has saturated, comparing a current count value in the second counter to a current count value in the third counter;

responsive to a determination that the current count value in the second counter is less than the current count value in the third counter, adjusting the prediction threshold towards a strongly taken prediction state of the prediction state machine; and responsive to a determination that the current count value in the second counter is greater than the current count value in the third counter, adjusting the prediction threshold towards a strongly not taken prediction state of the prediction state machine.

12. The computer implemented method of claim 11, further comprising:

resetting all counters in the set of counters to an initial value.

13. The computer implemented method of claim 1, wherein a number of counter sets maintained in the pattern history table is a fraction of a number of entries in pattern history table, wherein each set of counters evaluates a group of pattern history table entries, and wherein the set of counters periodically associates itself with an entry in the group of pattern history table entries.

14. The computer implemented method of claim 1, wherein the set of counters in a shared pool of counters are allocated to an entry after achieving saturation or after a fixed number of clock cycles have occurred.

15. The computer implemented method of claim 1, wherein counter sets are allocated to entries on a cyclical, random, or on-demand basis.

16. A computer program product comprising:

one or more computer-readable, non-transitory storage mediums;

computer usable program code stored in at least one of the one or more computer-readable, non-transitory storage mediums for obtaining a count value of a prediction state counter in an entry in a pattern history table, wherein the count value represents a prediction state of a prediction state machine for the entry;

computer usable program code stored in at least one of the one or more computer-readable, non-transitory storage mediums for changing one or more count values in a set of counters allocated to the entry in the pattern history table based on the count value of the prediction state counter in the entry; and computer usable program code stored in at least one of the one or more computer-readable, non-transitory storage mediums for adjusting a prediction threshold of the prediction state machine for the entry based on an analysis of the changed one or more count values in the set of counters, wherein the prediction threshold is adjusted by changing a count value in a prediction threshold counter in the entry in the pattern history table, and wherein adjusting the prediction threshold redefines predictions provided by the prediction state machine.

17. The computer program product of claim 16 further comprising:

computer usable program code stored in at least one of the one or more computer-readable, non-transitory storage mediums for incrementing a first counter in the set of counters allocated to the entry each time a prediction is made;

computer usable program code for stored in at least one of the one or more computer-readable, non-transitory storage mediums incrementing one of a second counter or a third counter in the set of counters, wherein the second counter is incremented when the count value of the prediction state counter in the entry indicates a prediction of strongly taken, and wherein the third counter is incremented when the count value of the prediction state counter in the entry indicates a prediction of strongly not taken;

computer usable program code stored in at least one of the one or more computer-readable, non-transitory storage mediums for comparing, in response to a determination that the first counter has saturated, a current count value in the second counter to a current count value in the third counter;

computer usable program code stored in at least one of the one or more computer-readable, non-transitory storage mediums for adjusting, in response to a determination that the current count value in the second counter is less than the current count value in the third counter, the prediction threshold towards a strongly taken prediction state of the prediction state machine; and computer usable program code stored in at least one of the one or more computer-readable, non-transitory storage mediums for adjusting, in response to a determination that the current count value in the second counter is greater than the current count value in the third counter, the prediction threshold towards a strongly not taken prediction state of the prediction state machine.

18. The computer program product of claim 16 further comprising:

computer usable program code stored in at least one of the one or more computer-readable, non-transitory storage mediums for incrementing one of a first counter, a second counter, or a third counter in the set of counters, wherein the first counter is incremented upon a determination that an unbiased prediction threshold provides an accurate prediction for the entry, wherein the second counter is incremented upon a determination that a biased prediction threshold towards the strongly taken prediction state improves the prediction for the entry, and wherein the third counter is incremented upon a determination that a biased prediction threshold towards the strongly not taken prediction state improves the prediction for the entry;

computer usable program code stored in at least one of the one or more computer-readable, non-transitory storage mediums for determining that a counter in the set of counters has saturated;

computer usable program code stored in at least one of the one or more computer-readable, non-transitory storage mediums for determining the counter in the set of counters that has a highest count value; and computer usable program code stored in at least one of the one or more computer-readable, non-transitory storage mediums for adjusting the prediction threshold towards the prediction state having the highest count value in the set of counters.

19. The computer program product of claim 16 further comprising:

computer usable program code stored in at least one of the one or more computer-readable, non-transitory storage mediums for incrementing a first counter in the set of counters allocated to the entry each time a prediction is made;

computer usable program code stored in at least one of the one or more computer-readable, non-transitory storage mediums for incrementing one of a second counter or a third counter in the set of counters, wherein the second counter is incremented to indicate a number of times the prediction caused the prediction state in the prediction state counter to move from a state which predicts not taken to a state which predicts taken, and wherein the third counter is incremented to indicate a number of times the prediction caused the prediction state in the prediction state counter to move from a state which predicts taken to a state which predicts not taken;

computer usable program code stored in at least one of the one or more computer-readable, non-transitory storage mediums for comparing, in response to a determination that the first counter has saturated, a current count value in the second counter to a current count value in the third counter;

computer usable program code stored in at least one of the one or more computer-readable, non-transitory storage mediums for adjusting, in response to a determination that the current count value in the second counter is less than the current count value in the third counter, the prediction threshold towards a strongly taken prediction state of the prediction state machine; and computer usable program code stored in at least one of the one or more computer-readable, non-transitory storage mediums for adjusting, in response to a determination that the current count value in the second counter is greater than the current count value in the third counter, the prediction threshold towards a strongly not taken prediction state of the prediction state machine.

20. An apparatus comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to obtain a count value of a prediction state counter in an entry in a pattern history table, wherein the count value represents a prediction state of a prediction state machine for the entry; change one or more count values in a set of counters allocated to the entry in the pattern history table based on the count value of the prediction state counter in the entry; and adjust a prediction threshold of the prediction state machine for the entry based on an analysis of the changed one or more count values in the set of counters, wherein the prediction threshold is adjusted by changing a count value in a prediction threshold counter in the entry in the pattern history table, and wherein adjusting the prediction threshold redefines predictions provided by the prediction state machine.

* * * * *